United States Patent [19]
Anderson et al.

[11] Patent Number: 5,028,568
[45] Date of Patent: Jul. 2, 1991

[54] NIOBIUM-DOPED TITANIUM MEMBRANES

[75] Inventors: Marc A. Anderson, Madison, Wis.; Hirofumi Kikkawa, Hiroshima, Japan

[73] Assignee: Wisconsin Alumni Research Foundation, Madison, Wis.

[21] Appl. No.: 376,107

[22] Filed: Jul. 5, 1989

[51] Int. Cl.$^5$ .............................................. C04B 35/46
[52] U.S. Cl. ..................................... 501/12; 501/134; 252/62.3 BT
[58] Field of Search .......................... 501/12, 134, 152; 252/520, 521, 62.3 BT; 106/287.19; 204/290 F, 290 R, 295, 282; 427/126.2, 126.3

[56] References Cited

U.S. PATENT DOCUMENTS

| | | | |
|---|---|---|---|
| 3,948,751 | 4/1976 | Bianchi et al. | 204/290 F |
| 4,003,817 | 1/1977 | Bianchi et al. | 204/290 F |
| 4,483,785 | 11/1984 | Johnson et al. | 252/520 |
| 4,517,068 | 5/1985 | Hinden et al. | 204/283 |

OTHER PUBLICATIONS

"Sol-Gel Processing", Donald R. Ulrich; Chemtech, Apr. 1988 pp. 242-249.

Primary Examiner—William R. Dixon, Jr.
Assistant Examiner—Chris Gallo
Attorney, Agent, or Firm—Quarles & Brady

[57] ABSTRACT

A metal oxide particulate membrane is made more electrically conductive, and thus more suitable for electrochemical cells by the incorporation into the membrane of a dopant element. The dopant is dissolved in an alcohol and then incorporated in the sol-gel process used to form the particulate metal oxide membrane. The invention is exemplified by a niobium doped titanium dioxide ceramic membrane which has good porosity while having a conductivity several orders of magnitude higher than a similar membrane made without incorporating the niobium dopant.

16 Claims, 3 Drawing Sheets

EFFECT OF Nb ON CONDUCTIVITY LEVEL

EFFECT OF Nb ON CONDUCTIVITY LEVEL

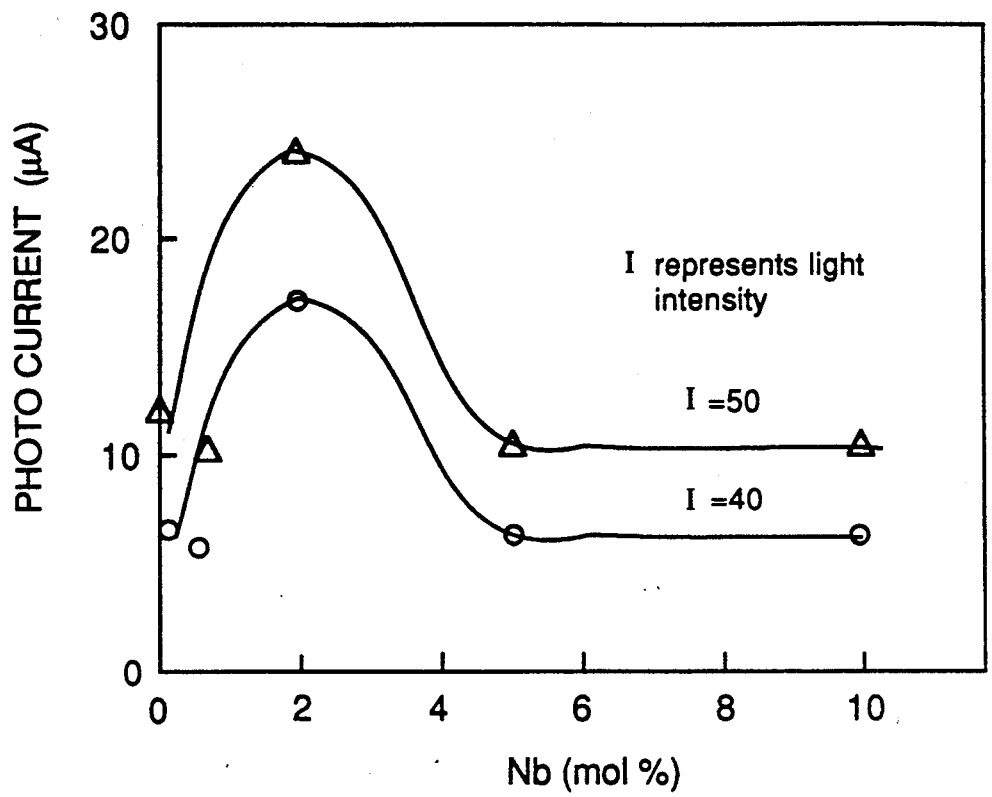
FIG. 3 RELATIONSHIP BETWEEN PHOTOCURRENT AND Nb DOPING LEVEL
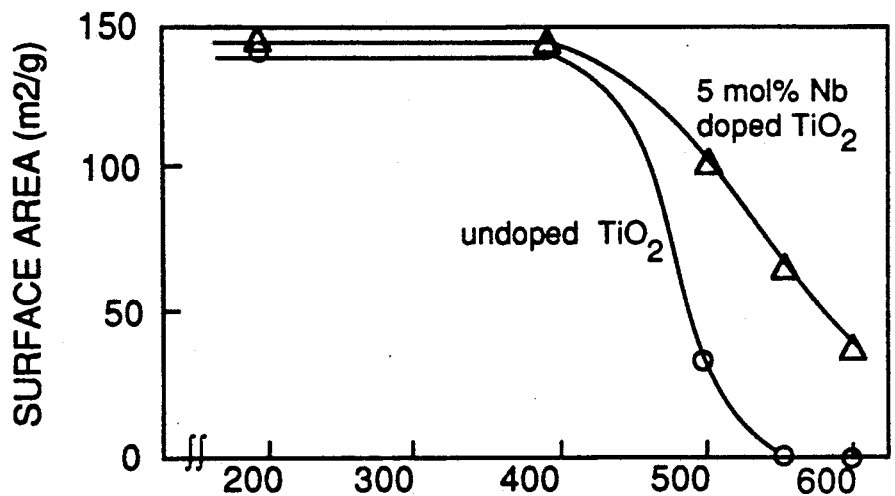
FIG. 4 EFFECT OF HEATING TEMPERATURE ON SURFACE AREA

NIOBIUM-DOPED TITANIUM MEMBRANES

FIELD OF THE INVENTION

The present invention relates, in general, to the production of ceramic membranes of metal oxides, and relates, in particular, to the preparation of metal oxide ceramic membranes with improved conductivity due to a dopant added to the membrane during formulation.

BACKGROUND OF THE INVENTION

It is known that ceramic films or membranes may be made of metal oxide materials, such as titanium dioxide. Such membranes are typically made by a sol-gel process in which a metal oxide precurser, typically an organometallic compound such as a metal alkoxide, is dissolved in an alcohol at low temperature and hydrolyzed and peptized to create a colloidal suspension or sol. Such sols can be slowly dewatered or can be coated onto substrates to form gels, which can be sintered into ceramic membranes, either unsupported or supported. By controlling the conditions of the sol-gel process, the metal oxide can be manipulated to form particles of selected size, which when fused into a particulate membrane, results in a membrane of a selected average hole or pore size. Normally in such membranes, porosity and conductivity are inversely related. This relation would be expected since increasing porosity is related to less contact between the sintered particles, and thus less surface area for electron flow. This property can, however, be a disadvantage in any application in which both high porosity and high conductivity are desirable.

One application in which both high porosity and high conductivity are desirable is the use of such a metal ceramic membrane as an electrode in an electrochemical cell. In such an application, it is desirable to have maximum surface area contact between the electrodes and the ionic solution of the cell. Higher porosity gives a higher effective surface area between the membrane used as an electrode and the solution into which it is placed. At the same time, it is clear that high conductivity is desirable for any material to be used as an electrode, to facilitate current flow into and out of the electrode from the appropriate electric circuitry.

It has been suggested previously that it is possible to dope other metallic materials into metal oxide ceramic membranes. However, most of the techniques previously suggested for the fabrication of doped membranes cannot be applied at as low a temperature as is required for the sol-gel process.

SUMMARY OF THE INVENTION

The present invention is summarized in that a metal oxide particulate ceramic membrane is doped with a transition group metal of a valence one different from the metal of the membrane, to enhance the conductivity of the membrane without adversely affecting its porosity.

It is another object of the present invention to provide a sol-gel method of fabricating metal oxide ceramic membranes in which a dopant metal can be inherently integrated into the membrane during its fabrication.

It is yet another object of the present invention to create a niobium doped titanium dioxide ceramic membrane combining good qualities of porosity and conductivity and thus potentially useful as an electrode in an electrochemical cell.

Other objects, advantages and features of the present invention will become apparent from the following specification when take in conjunction with the accompanying drawings.

BRIEF DESCRIPTION OF THE DRAWINGS

FIG. 3 is a graphical representation of photocurrent versus level of niobium doping in an exemplary membrane constructed according to the present invention.

FIG. 4 is a graphical representation of specific surface area versus firing temperature in an exemplary membrane constructed in accordance with the present invention.

DETAILED DESCRIPTION OF THE INVENTION

Figure 1:
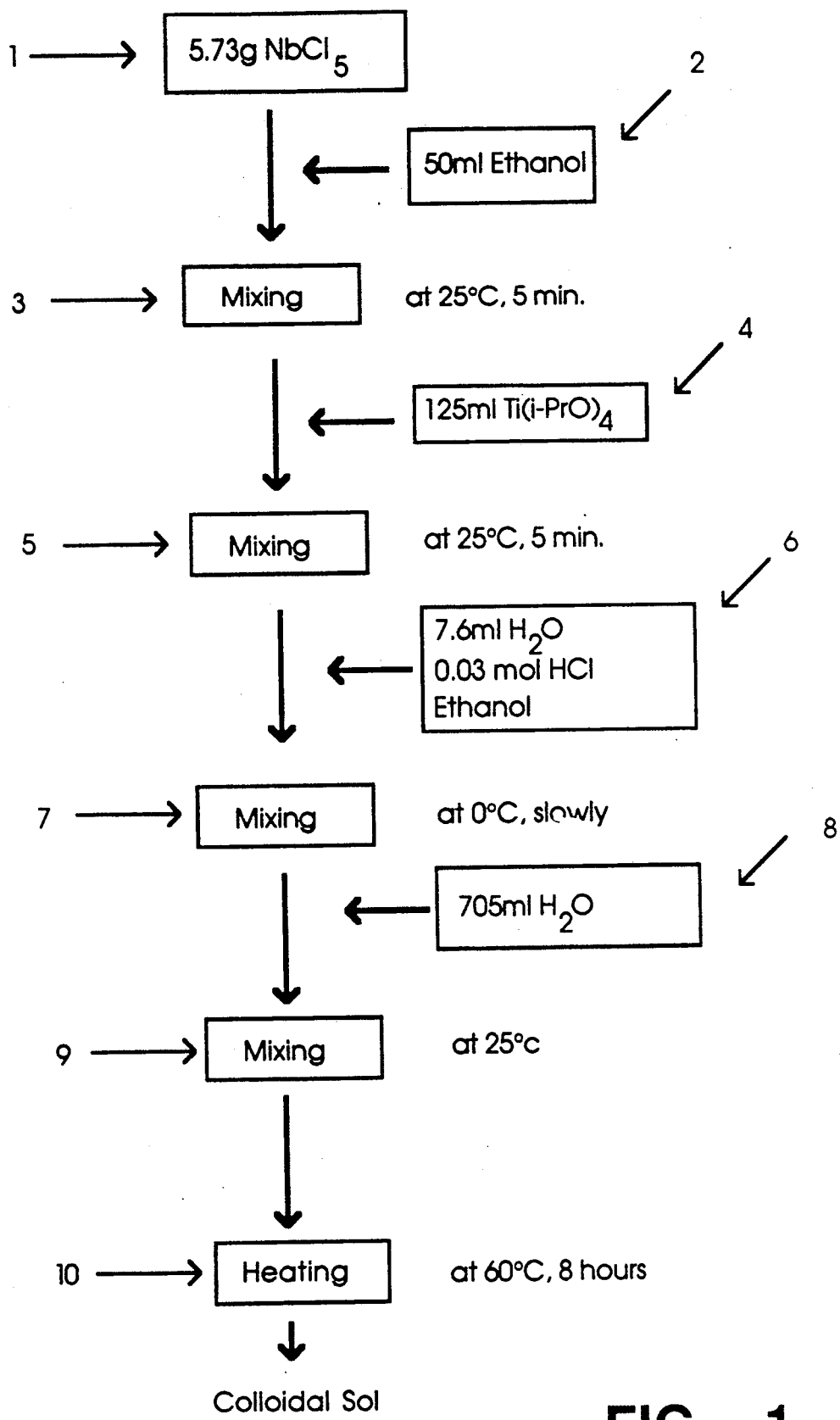
FIG. 1 is a schematic illustration of a flowchart of the process of the present invention.

The present invention is directed toward the creation of metal oxide particulate ceramic membranes which have been doped with a minority metal of a different valence so as to improve the conductivity characteristics of the membranes. Such membranes have specific utility in electrochemical cells in general and in particular for use in photovoltaic applications.

Metal oxide particulate ceramic membranes are created through a sol-gel process followed by sintering to create a ceramic material. The sol-gel process is intended to create particles of defined size, in the colloid stage, which are then condensed into a gel, consisting of a dense aqueous suspension of the same small particles. The gel is then dewatered and the dewatered gel is sintered to fuse the particles together, creating a porous ceramic material. Such a metal oxide ceramic membrane can be supported or unsupported, that is deposited on a substrate as a coating or existing as a film having independent structural characteristics and not being supported on an underlying surface.

Such metal oxide ceramic membranes have been fabricated using many transition metals. Most commonly aluminum, zirconium, silicon, and combinations of these two with titanium have been fabricated. Many other transition metals may also be used in the fabrication of such membranes, including lanthanum, germanium, tantalum, zinc, and other transition metals.

The doping material is intended to increase the electrical conductivity of the membrane. Therefore the element chosen to be the doping material in the metallic ceramic membrane should be another compatible transition metal that is selected to increase the conductivity of the material matrix by adding either access electrons or excess positive charge carriers (i.e. holes) into the matrix of material created in the particulate ceramic membrane. Thus, for example, using a titanium oxide ceramic membrane, since titanium is tetravalent in the form utilized in such a membrane, the doping material should be selected to be either trivalent or pentavalent. One preferable material useful as a dopant in a titanium oxide membrane is niobium, which exists in a pentavalent form. Obviously for differing metallic ceramic materials, different transition metal dopants must be selected, varying by preferably one valence number from the metal which makes up the bulk of the metal ceramic oxide membrane.

The method used successfully here to advantageously introduce dopant materials into the metal oxide ceramic material is to begin with the dopant material in anhydrous alcohol solution. The alcohol solution containing the dopant is then incorporated into the metal alkoxide used as the starting material in a sol-gel process to prepare the metallic oxide ceramic material. In this fashion the dopant is incorporated into the colloidal suspension from the beginning of the process and therefore is incorporated in the colloidal particles in small quantities during the initial formation of the colloidal particles. Hence after the introduction of the material in the beginning of the process, the procedure for creating metal oxide ceramic membranes can be thereafter followed to create the incorporated dopant in the final supported or unsupported membrane.

It has been found that incorporating a dopant into a metal oxide particulate ceramic membrane in this fashion results in a product membrane advantageously combining several qualities. The doped membrane has an electrical conductivity which is several orders of magnitude higher than a similar membrane without the dopant, the exact increase varying with the level of dopant added. At the same time, the porosity and surface area remain high. Thus the membrane combines usually disparate qualities to be an attractive candidate for use in electrochemical, photochemical or other catalytic applications in which a combination of porosity and conductivity is desirable.

The process and product produced by the present invention can be better understood by reference to the following examples which are intended by way of illustration and not by way of limitation.

EXAMPLES

This example describes the creation of a titanium dioxide particulate ceramic membrane doped with niobium. The beginning materials utilized were niobium pentachloride and titanium tetraisopropoxide. Also used as a starting material is anhydrous ethanol. The chemicals were used as purchased without further purification, and all water used in the reactions was deionized using a Mili-q water purification system as sold by Milipore Corp.

The process began with the selection of the molar ratio between water and titanium dioxide and also the ratio of dopant contained in the titanium matrix. Having selected a molar ratio between water and titanium dioxide of 99 to 1, and a molar ratio of atoms of titanium to niobium of 100 to 5, the procedure utilized began with the mixing of 5.73 grams of niobium pentachloride into 50 milliliters of anhydrous ethanol. The solution was then stirred for 5 minutes at room temperature to dissolve the niobium dopant salt. To the solution was then added 125 milliliters of titanium tetraisopropoxide. Again the reaction vessel was stirred for 5 minutes at room temperature as shown at 5. Shown in FIG. 1 is a schematic illustration of a flow chart illustrating this process. At FIG. 1 the process begins with the niobium pentachloride at step 1 with the ethanol added at step 2, and the mixing at 3. The titanium isopropoxide was added at step 4.

Next, to this reaction solution was added in a sequence of slow drops, 108 milliliters of a solution which contained 7.6 milliliters of water, 0.03 molar hydrochloric acid and ethanol, as shown at 6 while cooling the solution with ice to approximately 0° C. After the addition of the peptizing acid was complete, 750 milliliters of water dilutent was added, while vigorously stirring the solution until it turned transparent. This dilution of the reaction vessel is necessary to obtain proper dilution of the niobium in the resulting colloid. This is indicated at 8 in the flow sheet of FIG. 1.

Thereafter the solution was mildly heated to 60° C. for 8 hours while continuous stirring occurred as illustrated at step 10.

This solution turned during the heated stirring 10 into a colloidal solution. Various runs of the colloidal solutions were coated onto glass and fired while others were dried in a plastic petri dish to form an unsupported membrane in the bottom of the petri dish. In any event, the colloidal concentrations thus formed, referred to as gels, were then fired at temperatures up to 500° C. to form a stable, hard and durable ceramic membranes.

This process of preparing the titanium ceramic membranes with the niobium doping was repeated with a niobium doping level which varied from 0 to 10% molar niobium of the total metal in the ceramic membrane.

The process was also repeated several times with a doping level of 5%, as in the example above, and the resulting gels were sintered at temperatures varying between 200° and 600° C. to determine the effect of heating temperature on surface area.

Figure 2:
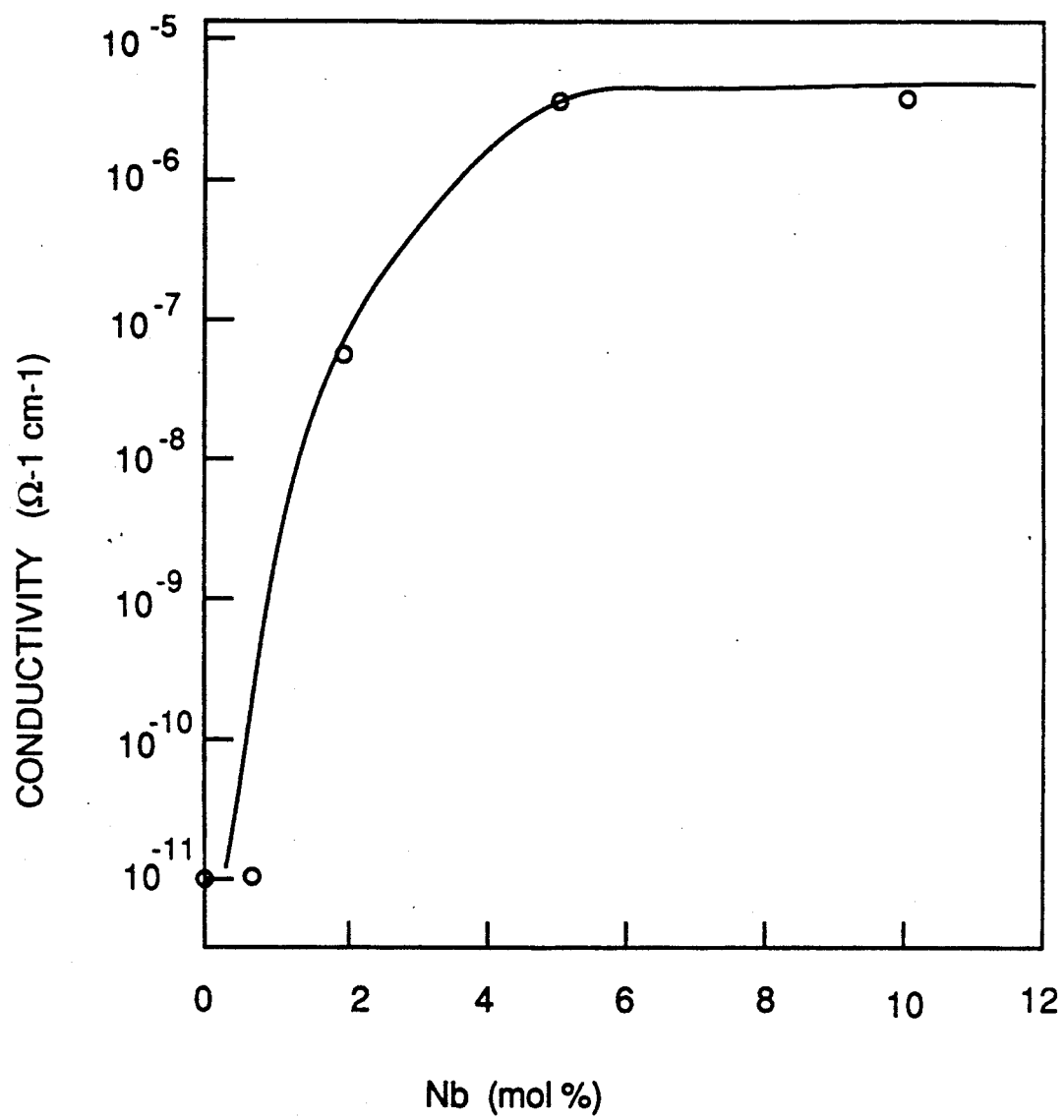
FIG. 2 is a graphical plot of conductivity versus level of niobium doping in an exemplary membrane constructed according to the present invention.

The results of these subsequent replications of the example are indicated in the charts of FIGS. 2 through 4. FIG. 2 illustrates the effect of niobium doping level on the conductivity of the titanium ceramic membrane. As can be viewed from the chart of FIG. 2, the difference in the conductivity of the titanium ceramic membrane between the level of 0 doping and a doping level of 5% niobium in the titanium membrane was a difference of 5 orders of magnitude in increased electrical conductivity. The conductivity did not seem to increase with further doping levels. However, an increase of 5 orders of magnitude in conductivity represents a dramatic increase in conductivity offering much greater utility in applications requiring electrical conduction through the ceramic membrane. The membranes from which the data in FIG. 2 were derived were fired at 600 for 3 hours.

Shown in FIG. 3 is a measurement of photocurrent at 2 different given and fixed levels of intensity of incident light radiation. The figure is intended to illustrate the relationship between the resultant photocurrent induced in the titanium ceramic membrane in the amount of niobium doping in the membrane. The results indicate that photocurrent initially increases with the level of doping in the titanium ceramic membrane to a local maximum of about 2 molar percentage of the total metallic material in the ceramic membrane.

For titanium ceramic membranes which are not doped, there tends to be a loss of porosity and thereby a loss of overall surface area as the heating temperature increases. Shown in FIG. 4 is a graphical illustration of the relationship between heating temperature and surface area for a niobium doped membrane doped at a level of 5% niobium in the titanium matrix. The chart illustrates that the niobium doped membrane retains its surface area through higher levels of heating temperature thereby indicating that its porosity is maintained through higher firing temperatures. This allows for the use of higher firing temperatures which creates a more stable and fixed membrane. The maintenance of high levels of porosity is obviously desirable in a membrane used for catalysis or photochemical applications since the surface area between the electrode and the solution into which it is introduced should be as large as possible so as to allow maximum interaction between the molecules of the ceramic material and the reaction solution.

It is to be appreciated that the foregoing examples and specification are by way of illustration and not by limitation and the present invention embodies modified forms thereof as come within the scope of the following claims.

What is claimed is:

1. A method of making a metal oxide ceramic membrane with improved conductivity comprising the steps of:
    (a) dissolving in alcohol a quantity of a dopant element selected to have a valence value one different from the metal of the metal oxide ceramic;
    (b) combining with the dissolved dopant a quantity of a metal alkoxide selected to give a preselected ratio metal to dopant in excess of ten to one in the resultant membrane;
    (c) adding to the combination solution a limited amount of water and an acid in sufficient quantity to begin to peptize the metal oxide;
    (d) slowly adding an additional quantity of water to the combination solution;
    (e) heating the combination solution while stirring until a colloidal suspension is achieved;
    (f) separating water from the colloidal suspension until a gel is made; and
    (g) sintering the gel at a temperature of between about 200° C. and 600° C. into a unitary, durable, continuous porous ceramic membrane which then has incorporated into it the dopant element and which has an electrical conductivity of at least ten times higher than a porous ceramic membrane made without the dopant element.

2. The method of claim 1 wherein the metal alkoxide is in alcohol solution and wherein the alcohol in which the dopant is dissolved in a different alcohol from the alcohol in the metal alkoxide solution.

3. The method of claim 1 wherein the ratio of metal to dopant is between 100 and 10 to one.

4. The method of claim 1 wherein prior to step (c), the mixture is anhydrous.

5. The method of claim 1 wherein the sintering is at a temperature of 400 to 600 degrees C.

6. The method of claim 1 wherein the resultant membrane has conductivity at least one thousand times greater than the conductivity of a similar membrane prepared without the dopant being added.

7. The method of claim 1 wherein the dopant element has a valence value one more than the metal of the membrane.

8. A method of making a niobium doped titanium ceramic membrane comprising the steps of:
    (a) dissolving in alcohol a quantity of a niobium slat;
    (b) adding to the dissolved niobium salt a quantity of a titanium alkoxide, the quantity selected to give a molar ratio of between 10 and 100 of titanium to niobium in the solution;
    (c) adding a limited amount of water and an acid to commence the peptizing of the titanium oxide molecules;
    (d) diluting the combination with additional water and stirring to ensure complete mixing;
    (e) heating the combination while stirring for a sufficient time for a colloidal suspension to form;
    (f) dewatering the colloidal suspension to make a gel; and
    (g) sintering the gel at a temperature of between about 200° C. and 600° C. to make a titanium oxide porous ceramic particulate membrane having a selected amount of niobium integrally incorporated into the membrane the membrane having an electrical conductivity of at least ten times higher than a porous ceramic membrane made without the niobium.

9. The method of claim 8 wherein the titanium alkoxide is dissolved in alcohol and wherein the alcohol in which the niobium is dissolved is a different alcohol from the alcohol in the titanium alkoxide.

10. The method of claim 9 wherein the alcohol in which the niobium is dissolved is ethanol and the titanium is tetraisopropoxide.

11. The method of claim 8 wherein prior to step (c), the mixture is anhydrous.

12. The method of claim 8 wherein the acid is hydrochloric acid.

13. The method of claim 8 wherein the sintering is at a temperature of 400 and 600 degrees C.

14. The method of claim 8 wherein the resultant membrane has conductivity at least one thousand times greater than the conductivity of a titanium oxide ceramic membrane prepared without the niobium being added.

15. A novel composition of matter comprising a titanium oxide particulate porous ceramic membrane having integrally incorporated into its particles doping atoms of niobium in amount such that the ratio of titanium to niobium is between 100 and 10 to one, wherein the membrane has an electrical conductivity at least ten times higher than a titanium oxide particulate membrane without the niobium doping and a surface area in excess of 50 square meters per gram.

16. A porous particulate metal oxide ceramic membrane in which a dopant is integrally incorporated in the particles of the metal oxide sintered into the membrane, the dopant selected to have a valence value one different from the metal and present at a concentration of less than 10% of the metal of the metal oxide the electrical conductivity of the metal oxide ceramic membrane being at least ten times higher than the electrical conductivity of a metal oxide membrane without the dopant, the porous ceramic membrane having a surface area in excess of 50 square meters per gram.

* * * * *